United States Patent
Miyaoka

(10) Patent No.: US 8,024,019 B2
(45) Date of Patent: Sep. 20, 2011

(54) PORTABLE INFORMATION TERMINAL

(75) Inventor: Hidekazu Miyaoka, Kanagawa (JP)

(73) Assignee: Sony Ericsson Mobile Communications AB, Lund (SE)

( * ) Notice: Subject to any disclaimer, the term of this patent is extended or adjusted under 35 U.S.C. 154(b) by 563 days.

(21) Appl. No.: 12/185,325

(22) Filed: Aug. 4, 2008

(65) Prior Publication Data
US 2009/0061963 A1 Mar. 5, 2009

(30) Foreign Application Priority Data
Aug. 30, 2007 (JP) ................ 2007-224794

(51) Int. Cl.
| H04M 1/00 | (2006.01) |
| H04M 9/00 | (2006.01) |
| G06F 1/16 | (2006.01) |
| H05K 5/00 | (2006.01) |
| H05K 7/00 | (2006.01) |
| H05K 7/14 | (2006.01) |
| H01R 13/46 | (2006.01) |
| E05D 11/00 | (2006.01) |
| E05D 7/04 | (2006.01) |

(52) U.S. Cl. ........ 455/575.4; 455/575.1; 455/550.1; 174/542; 174/535; 174/520; 361/756; 361/679.39; 361/679.09; 379/433.12; 16/221; 16/235

(58) Field of Classification Search .......... 455/575.4, 455/575.1, 550.1; 174/542, 535, 520; 361/756, 361/679.39, 679.09; 379/433.12; 16/221, 16/235, 236, 239
See application file for complete search history.

(56) References Cited

U.S. PATENT DOCUMENTS

| 6,831,229 | B1 * | 12/2004 | Maatta et al. ............ 174/66 |
| 7,225,002 | B2 * | 5/2007 | Lee et al. ............ 455/575.4 |
| 2007/0197270 | A1 * | 8/2007 | Kim ............ 455/575.4 |
| 2007/0243896 | A1 * | 10/2007 | Maatta et al. ............ 455/550.1 |
| 2009/0011802 | A1 * | 1/2009 | Malthe et al. ............ 455/575.1 |
| 2009/0075707 | A1 * | 3/2009 | Lee ............ 455/575.4 |
| 2010/0087232 | A1 * | 4/2010 | Yeh et al. ............ 455/575.4 |

FOREIGN PATENT DOCUMENTS

| EP | 1 594 291 A1 | 11/2005 |
| EP | 1 777 923 A1 | 4/2007 |
| JP | 2006-93999 | 4/2006 |
| WO | WO 02/063789 A1 | 8/2002 |

OTHER PUBLICATIONS

U.S. Appl. No. 12/184,610, filed Aug. 1, 2008, Miyaoka.

* cited by examiner

Primary Examiner — George Eng
Assistant Examiner — Wesley L Kim
(74) Attorney, Agent, or Firm — Oblon, Spivak, McClelland, Maier & Neustadt, L.L.P.

(57) ABSTRACT

A portable information terminal has a first casing with operating buttons primarily mounted thereupon, and a second casing with primarily an output screen exposed. A sliding supporting member and casing turning supporting member are provided which realize a state wherein the first casing and second casing are overlapped, a state of mutually sliding, and a state wherein the first casing and second casing are turned to do away with any mutually overlapped portions. The sliding supporting members are positioned on both sides of the first casing and the casing turning supporting member is positioned on the central portion of the first casing. Thus, a sliding-type portable information terminal is provided with an expanded operating face and output face by doing away with any overlapped portions.

7 Claims, 13 Drawing Sheets

PORTABLE INFORMATION TERMINAL

CROSS REFERENCES TO RELATED APPLICATIONS

The present invention contains subject matter related to Japanese Patent Application JP 2007-224794 filed in the Japanese Patent Office on Aug. 30, 2007, the entire contents of which are incorporated herein by reference.

BACKGROUND OF THE INVENTION

1. Field of the Invention

The present invention relates to a portable telephone terminal, and specifically relates to a portable information terminal such as a portable telephone terminal, portable gaming device, or palm-size personal computer which can be altered between a portable state and usable state.

2. Description of the Related Art

Portable information terminals which are represented by a portable telephone terminal or the like are being developed in various forms so as to be more compact in a portable state than in a usable state. Representative forms thereof include a so-called "shell-form" (flip-phone) which employs a configuration which opens and closes similar to that of a clam-shell, and a "sliding form" wherein an upper casing slides as to a lower casing.

The related art described in Japanese Unexamined Patent Application Publication No. 2006-93999 is exemplified in FIG. 13 as an example of a sliding-type portable telephone, i.e. a sliding-type portable telephone which is formed with an upper casing 1 having a display unit 3 and receiver 4, and a lower casing 2 having an operating unit 5 and transmitter 6, so as to be slidable.

As shown in FIG. 13A, in the state of the upper casing 1 and lower casing 2 being closed, the display unit 3 and receiver 4 of the upper casing 1 are exposed, whereby the operating unit 5 and transmitter 6 of the lower casing 2 are covered by the upper casing 1. Also, as shown in FIG. 13B, in the state that the upper casing 1 and lower casing 2 are opened, the state thereof is such that each of the display unit 3 and receiver 4 of the upper casing 1 and the operating unit 5 and transmitter 6 of the lower casing 2 are exposed.

As shown in FIG. 13B, the dimensions in the sliding direction are L1 for the upper casing 1 and L2 for the lower casing 2, the dimensions in the state of the upper casing 1 and lower casing 2 being opened is L3, which is a dimension whereby a dimension L4 of the overlapped portion is subtracted from the sum total of L1 and L2.

SUMMARY OF THE INVENTION

As described above, the smaller the dimension of L4 is, the better. This is because the size of the area of the operating unit 5 can be increased without increasing the portable state size.

Also, it is desirable for the display unit 3 and operating unit 5 to form a single face. With the technology described in Japanese Unexamined Patent Application Publication No. 2006-93999, efforts are made to reduce the difference in thickness, such as chamfering the edge portion of the operating unit 5 side on the upper casing 1. However, this does not solve basic problems such as the problem wherein the keys in positions close to the upper casing 1 on the operating unit 5 are difficult to operate.

There has been found the need to provide a portable information terminal, wherein substantial expansion of the operating face or display face of the portable information terminal can be realized with a sliding-type portable information terminal.

According to an embodiment of the present invention, a sliding-type portable information terminal includes: a flat first casing; a flat second casing which is overlapped on the first casing; a sliding mechanism to maintain a portable state of the first casing and the second casing overlapped together; and a turning mechanism to change from the portable state to a usable state via a sliding state whereby the first casing and the second casing mutually slide.

The sliding mechanism formed with a first sliding mechanism has a sliding groove formed in the sliding direction in the first casing; a sliding supporting member formed to slide within the sliding groove without disengaging from the sliding groove; and a first fixing member to axially support an inverse sliding groove side on the sliding supporting member with the second casing; and a second sliding mechanism having a wide sliding groove formed on the first casing side of the second casing; and a casing turning member to slide within the wide sliding groove.

The turning mechanism has a first turning control member to axially support the inverse sliding wide groove side of the casing turning member with the first casing; and a second turning control member which is on the opposite side from the first turning control member on the casing turning member and which axially supports the second casing side so as to be turnable.

The first turning control member and the second turning control member have a turning angle control mechanism wherein turning is stopped at a angle formed by the face on the opposite side of the face of the second casing side of the first casing and the first casing side of the second casing forming a single face when the portable information terminal is in a usable state.

A portable information terminal can be provided which, when in the portable state, the lower casing (first casing) and upper casing (second casing) are overlapped together in a practical manner, and substantial expansion of the operation face and display face when in the usable state can be achieved.

The turning of the turning angle control mechanism may be stoppable while in the portable state and sliding state, while in the state of the vertical cross-section lengthwise direction of the first casing and the casing turning member are at a predetermined angle; and the turning of the turning angle control mechanism be stoppable while in the portable state and sliding state, while in the state of the vertical cross-section lengthwise direction of the second casing and the casing turning member are at a predetermined angle.

A portable information terminal having two pairs of first sliding mechanisms is practical from a functional design perspective. Providing a first sliding mechanism is more simple as compared to the second sliding mechanism, are multiples thereof can be readily provided. However, more than two is unnecessary, while only one may result in unstable sliding movement. Therefore, two pair is most practical.

A portable information terminal may be provided wherein the sliding groove on the first sliding mechanism is formed on the second casing side of the first casing. In this case, an external perspective view can be designed where the sliding mechanism does not protrude to the outside of the portable information terminal. Accordingly, the portable information terminal can be made more compact when in a portable state.

A portable information terminal may be provided wherein the sliding groove on the first sliding mechanism is formed on the side face of the first casing. In this case, the face of the second casing side of the first casing can be widely used, so operating keys can be disposed in a practical manner.

A portable information terminal may be provided wherein the flat form of the first casing and second casing are formed in roughly the same shape. In this case, the portable information terminal can be made more compact when in a portable state.

A portable information terminal may be provided wherein the casing turning member has a space for a cable reaching the first casing and second casing; and wherein such space for cable is formed such that a cable or the like to connect a board built into the first casing and a board built into the second casing can be provided therewithin.

Even if the cable to connect the board built in to the first casing and the board built into the second casing is a serial cable or the like, the space can be relatively easily secured and built therein in a practical manner.

With the above configuration, the portable information terminal according to an embodiment of the present invention employs a sliding-type mechanism which does not have a portion where the upper casing (second casing) and lower casing (first casing) are overlapped when in a usable state, so the operating face and display face can be substantially expanded, providing the advantages of being easy to use when in a usable state and compact when in a portable state.

DESCRIPTION OF THE PREFERRED EMBODIMENTS

Figure 1A:
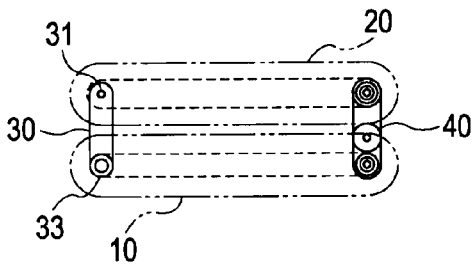
FIGS. 1A through 1G are cross-sectional diagrams illustrating the motion of a portable information terminal according to a first embodiment of the present invention.
Figure 1B:
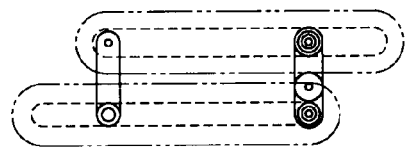
Figure 1C:
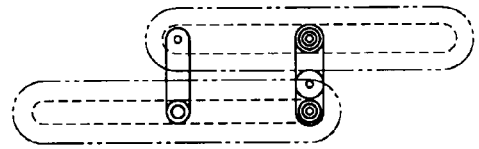
Figure 1D:
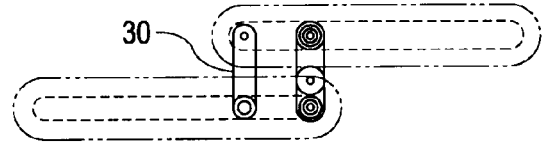
Figure 1E:
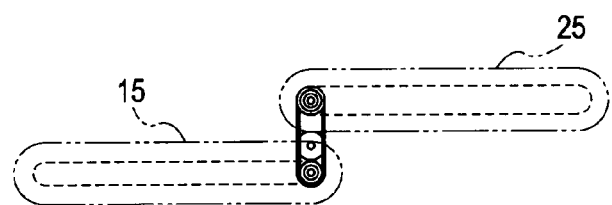
Figure 1F:
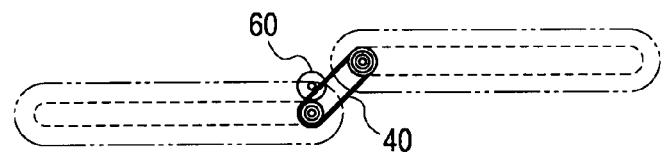

A portable telephone terminal will be described as an example of the portable information terminal relating to the present invention, with reference to the appended diagrams. With the present embodiment, a portable telephone terminal is exemplified, but it goes without saying that the content described here is only an example, and the present invention is not limited to a portable telephone terminal. For example, the present invention may also be applied to a portable personal computer, portable gaming device, PDA (personal data assistant), digital camera, digital video camera, and the like.

Schematic Configuration of Portable Telephone Terminal

FIGS. 1A through 1G illustrate the changes in form of the sliding-type portable telephone terminal from the portable state to the usable state.

As shown here, the portable telephone terminal according to the present embodiment has a first casing 10 having an operating face 15 whereupon operating buttons and so forth are primarily mounted, and a second casing 20 whereupon an output face 25 made from a liquid crystal display device and so forth is provided. For a user of the portable telephone terminal according to the present embodiment, the first casing 10 is positioned on the lower side and the second casing 20 is positioned on the upper side.

A sliding supporting member 30 and a casing turning supporting member 40 are provided which can realize a portable state wherein the first casing 10 and second casing 20 are overlapped together in the state that the operating face 15 cannot be seen and the output face 25 is exposed, a sliding state wherein the first casing 10 and second casing 20 are mutually sliding, a usable state wherein turning is performed so that there are no mutually overlapped portions and the first casing 10 and second case 20 form a single face. The sliding supporting member 30 is positioned on both sides of the first casing 10, and the casing turning supporting member 40 is positioned in the center portion of the first casing 10.

Also, in order to maintain a smooth sliding state without the first casing 10 and second casing 20 making contact while in the sliding state, a second casing supporting roller 60 is provided on the face of the second casing 20 side of the first casing 10. The length of the sliding direction of the first casing 10 and second casing 20 are the same dimension as the first casing 10 and second casing 20. Therefore, the sliding direction dimension in the case of overlapping becomes highly compact.

The face whereupon operating buttons or the like are primarily mounted on the first casing 10 is an operating face 15, and the face which exposes the output screen on the second casing 20 is the output face 25.

Figure 1G:
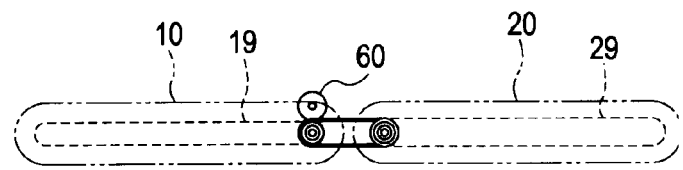

In the portable state (before sliding), the entire operating face 15 on the first casing 10 is hidden (FIG. 1A), but in the usable state (after sliding), the entire operating face 15 on the first casing 10 is exposed (FIG. 1G). A feature of the present invention is that a large operating face 15 can be secured as compared to the related art.

Plan View Configuration of Portable Telephone Terminal

Figure 2:
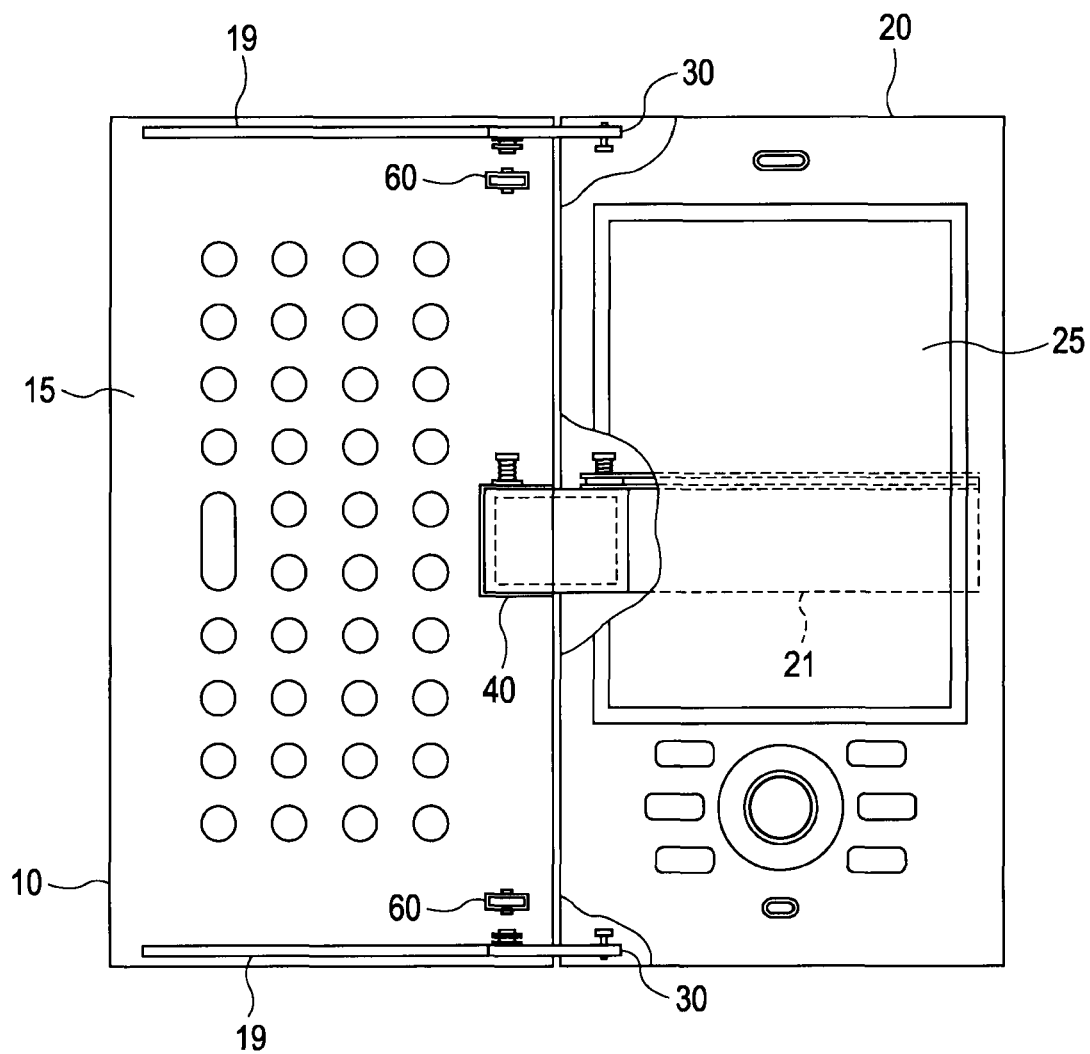
FIG. 2 is a plan view illustrating the portable information terminal according to the first embodiment of the present invention.

FIG. 2 illustrates a portable telephone terminal according to the first embodiment.

The first casing 10 has a so-called full-keyboard operating face 15, and the second casing 20 has operating keys such as a liquid crystal output face 15, speaker 22, microphone 23, and arrow keys 24. The sizes of the first casing 10 and second casing 20 in the planar direction are rectangles of roughly the same size. The widthwise direction of the rectangles is the sliding direction.

The operating face 15 of the first casing 10 has a sliding groove 19 along both edges widthwise. The sliding groove 19 is fixed so that the sliding supporting member 30 which forms an oval-shaped plate is slidable. The second casing 20 is fixed so as to be capable of turning on the opposite side of the sliding groove 19 with the sliding supporting member 30.

On the face on the opposite side from the display face 25 on the second casing 20, a wide sliding groove 21 is provided along the sliding direction in the lengthwise direction. The wide sliding groove 21 is fixed so that the casing turning member 40, which forms a width dimension to match the groove width, is slidable. The first casing 10 is fixed on the opposite side from the wide sliding groove 21 of the casing turning member 40 so as to be capable of turning.

Sliding Action

With such a configuration, the second casing 20 can slide along the sliding groove 19 as to the first casing 10 via the sliding supporting member 30. Simultaneously, the second casing 20 can slide along the wide sliding groove 21 via the sliding supporting member 40. That is to say, the first casing 10 and second casing 20 slide in the sliding groove 19 and wide sliding groove 21 on both sides while being supported by three points forming a triangle. At this time, second casing rollers 60 rotate while making contact with the face on the opposite side as the output face 25 on the second casing 20, thereby realizing smooth sliding.

Figure 3:
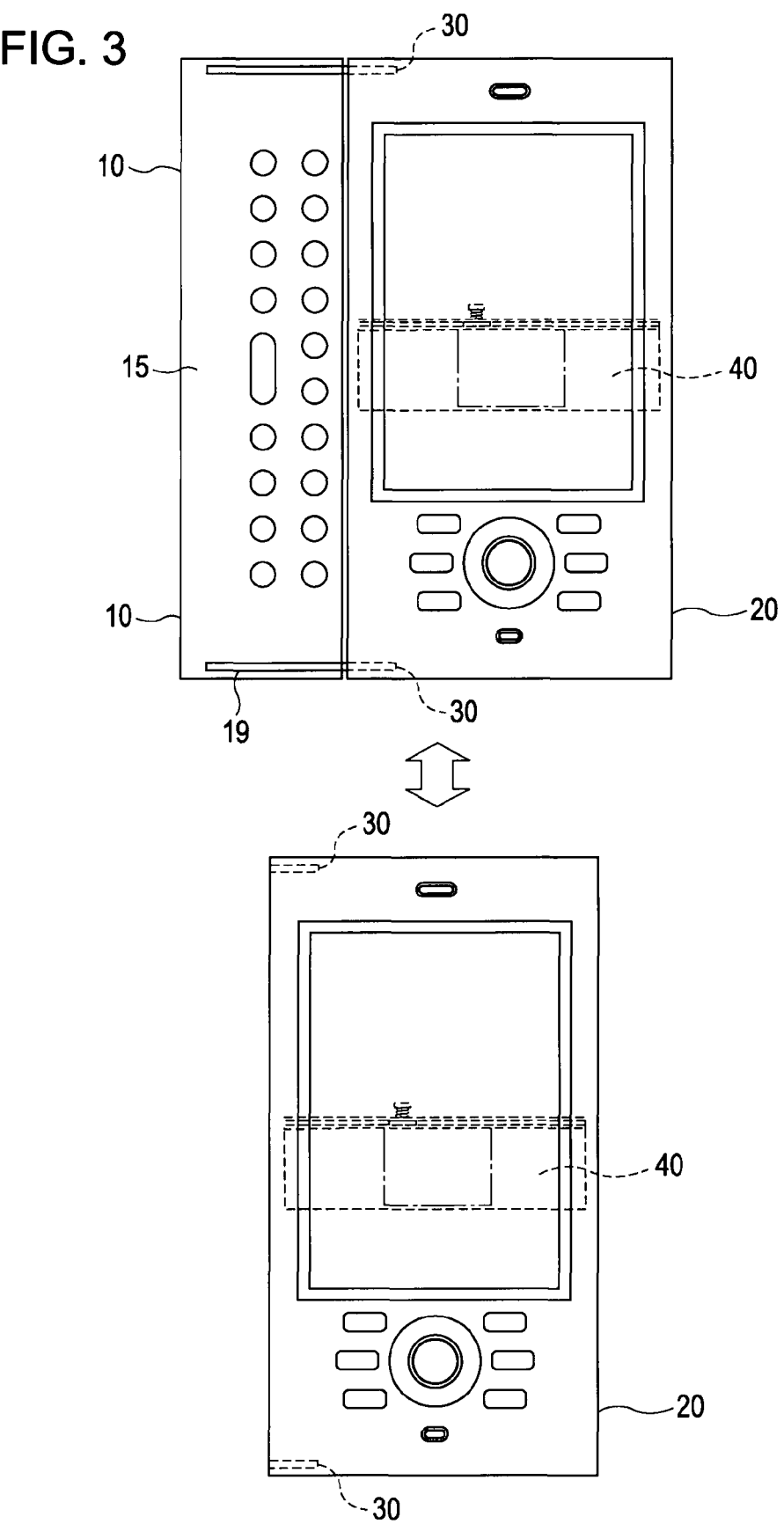
FIG. 3 is a plan view illustrating the motion of the portable information terminal according to the first embodiment of the present invention.

FIG. 3A illustrates the sliding state, and FIG. 3B illustrates the portable state. As shown in these diagrams, a three-point support with the casing turning member 40 in the center and two sliding supporting members 30 on both sides is formed, while altering the state from portable state to usable state, and from usable state to portable state.

In the case that the user externally applies force to slide, even if the direction of such external force is not completely the same as the sliding direction, there is the three-point support so a stabilized sliding state can be maintained.

From Sliding to Turning

Figure 4A:
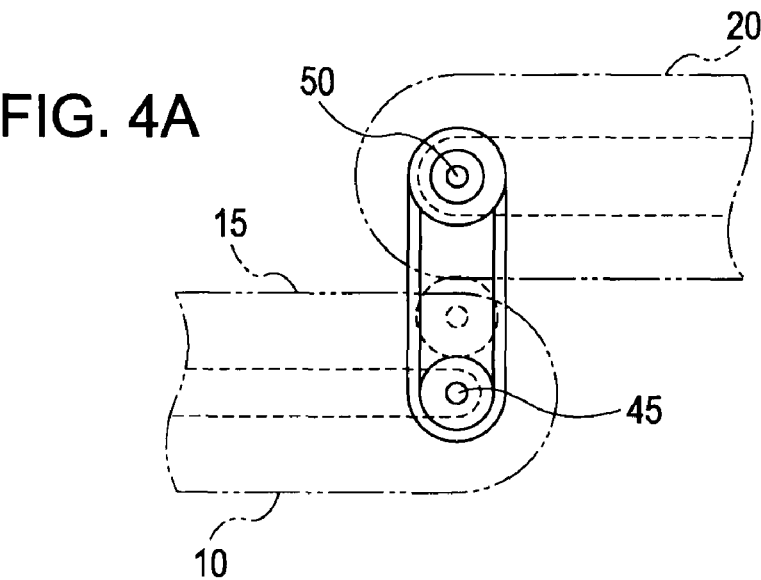
FIGS. 4A through 4C are three partial expanded cross-sectional views illustrating the motion of the portable information terminal according to the first embodiment of the present invention.
Figure 4B:
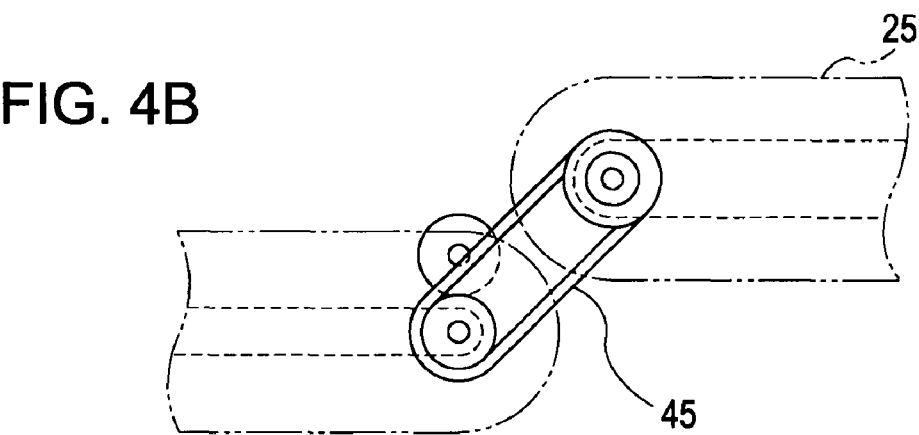
Figure 4C:
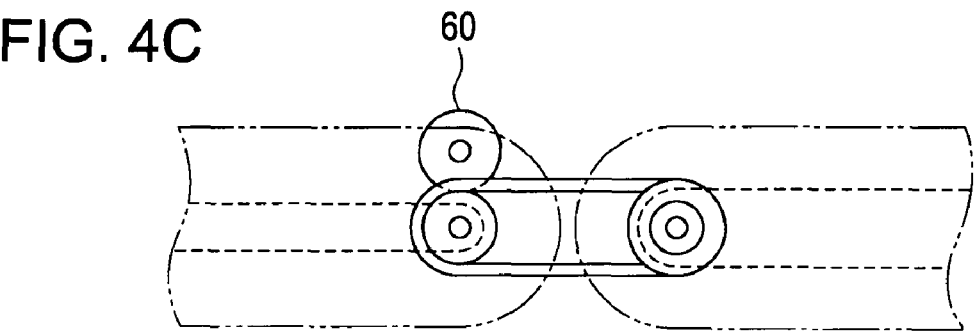

FIGS. 4A through 4C illustrate the casing turning member 40 in the event of ending the sliding state and changing to the usable state with the first casing 10 and second casing 20.

FIG. 4A is a cross-sectional diagram illustrating the start of turning after the sliding state is ended, i.e. immediately prior to changing to the usable state. FIG. 4B illustrates the turning process, and FIG. 4C illustrates the turning ended, i.e. the usable state. The first turning control shaft member 45 and second turning control shaft member 50 of the casing turning member 40 will be explained with the following FIG. 5. Note that FIG. 5 is a cross-sectional view of the state in FIG. 4A as seen from the right side.

Figure 5:
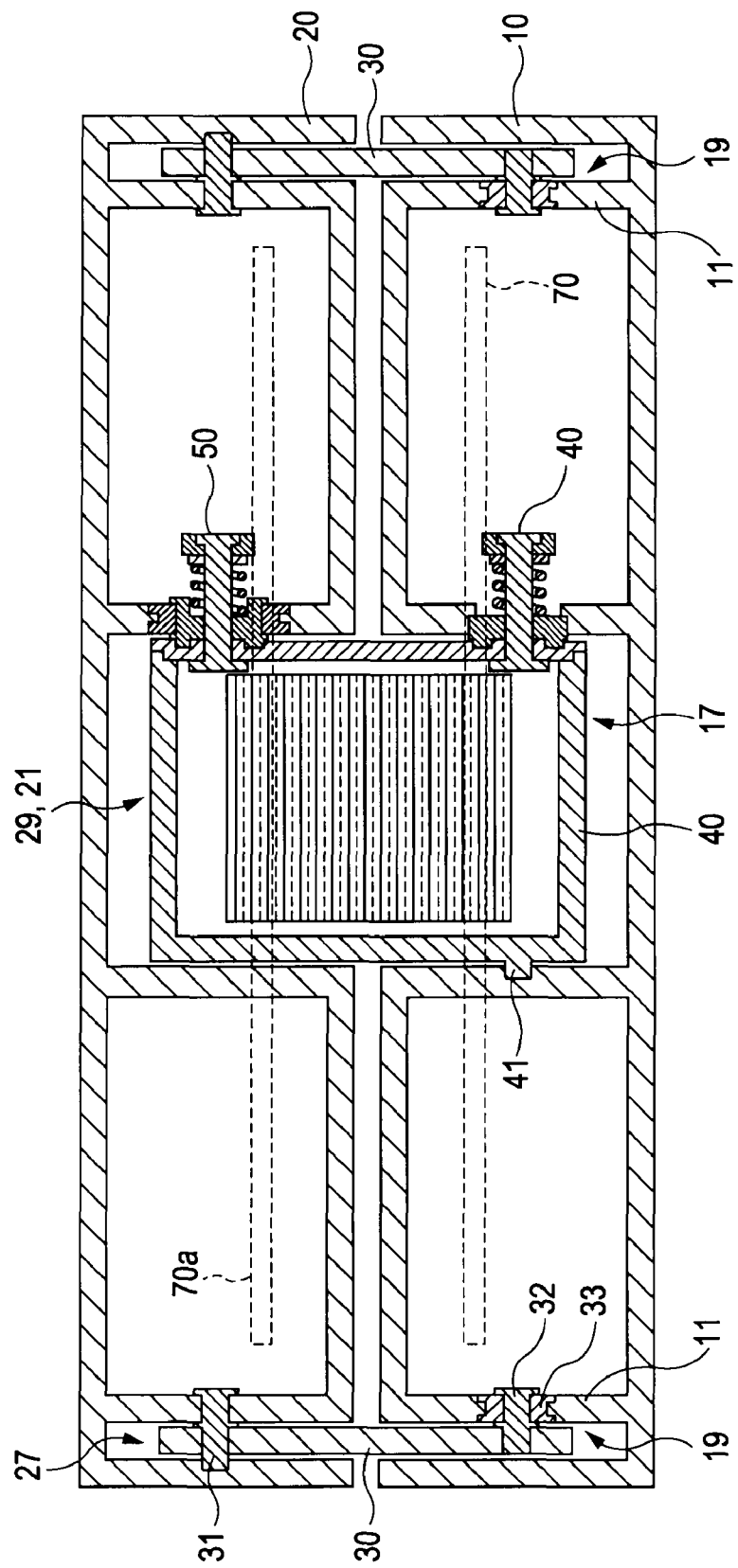
FIG. 5 is diagram illustrating a cross-sectional view of the primary portions of the portable information terminal according to the first embodiment of the present invention.

At the cross-section position shown in FIG. 5, the first casing 10 has sliding grooves 19, 19 on both sides and a casing turning member recessed portion 17, and the sliding grooves 19, 19 and casing turning member recessed portion 17 are open facing the top of the diagram. Also, a board 70 is built in which is shown with an imaginary line.

The second casing 20 has turning recessed portions 27, 27 on both sides and a turning recessed portion 29 (for the edge portion of the wide sliding groove 21) in the center, and the turning recessed portions 27, 27 and turning recessed portion 29 are open facing the bottom of the page. Also, a board 70a is built in which is shown with an imaginary line.

Sliding Supporting Member 30

Figure 6:
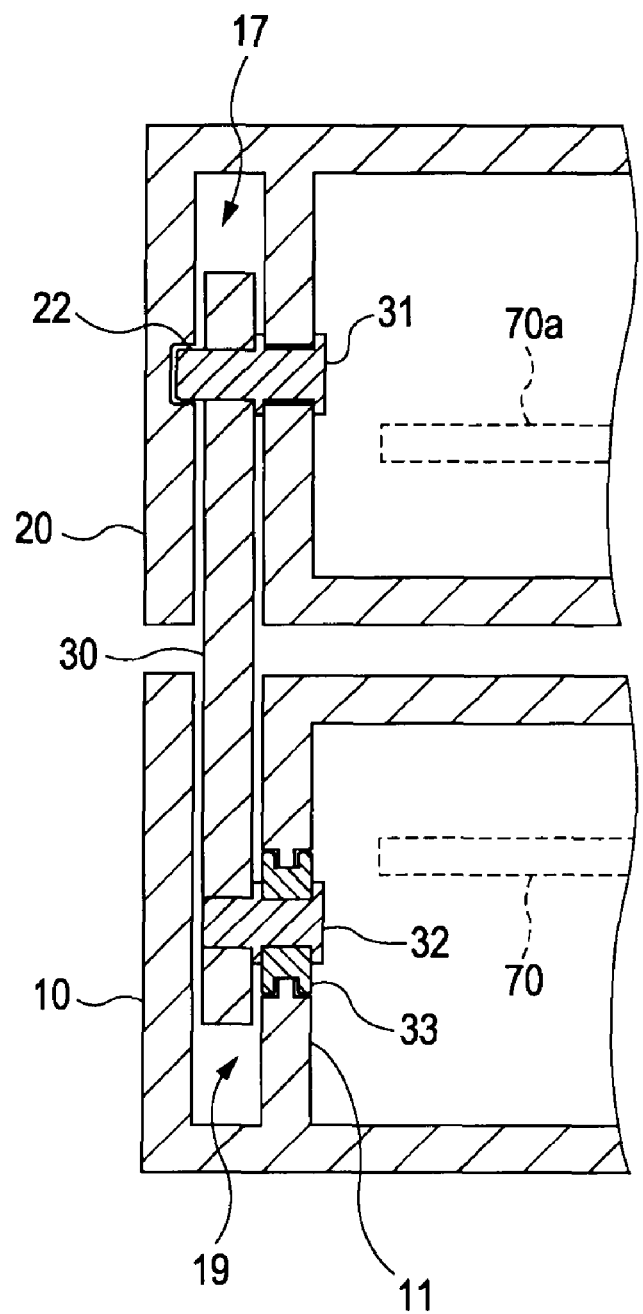
FIG. 6 is a partial expanded view of the primary portions shown in FIG. 4.

The sliding supporting member 30 will be described with reference to FIG. 5, and also with reference to FIG. 6 showing an enlarged view of the vicinity of the sliding supporting member 30.

The upper edge vicinity of the sliding supporting member 30 is axially supported with a first fixing pin 31 at the turning recessed portion 27 of the second casing 20. On the other hand, the lower edge vicinity of the sliding supporting member 30 axially supports a sliding pulley 33 with a second fixing pin 32 on the inner side of the first casing 10. The sliding pulley 33 has a flange shape, and is fitted into a pulley supporting unit 11 in a protruding shape formed on the inner side of the sliding groove 19 of the first casing 10. Thus, the sliding supporting member 30 can move along the lengthwise direction of the sliding groove 19 while supporting the second casing 20.

Casing Turning Member 40

Figure 7:
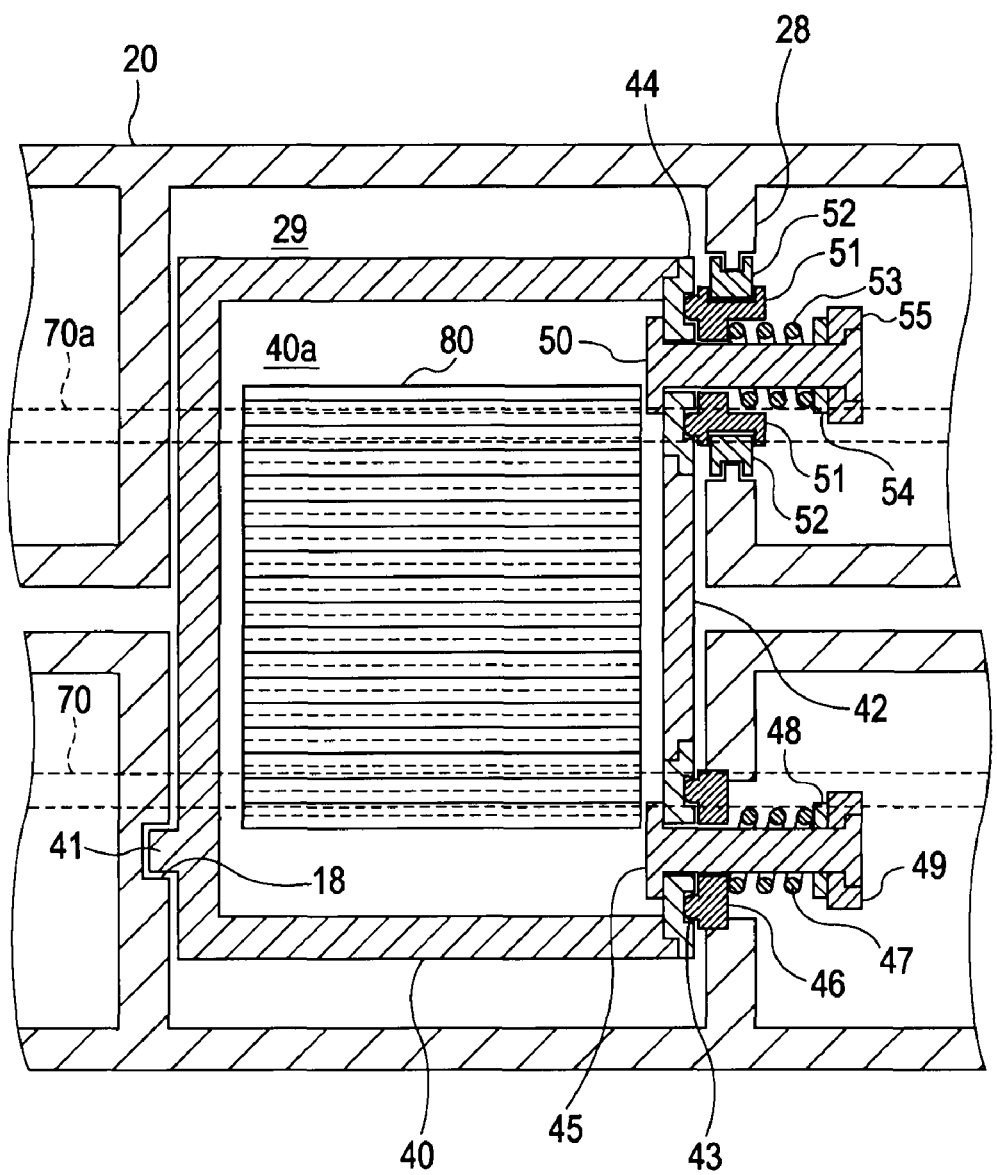
FIG. 7 is a partial expanded view of the primary portions shown in FIG. 4.

The casing turning member 40 will be described with FIG. 7 showing an enlarged view of the vicinity of the casing turning member 40, and FIG. 8 which is a configuration perspective view.

The casing turning member 40 has an oval-shaped cross-section in the direction vertical to the sheet in FIG. 5, and a turning shaft supporting protruding member 41 is provided near the bottom of the sheet in FIG. 7. A casing turning member recessed portion 18 is provided on the first casing 10 to support the turning shaft supporting protruding member 41. The casing turning member 40 is a casing with a hollow inner portion thereof, which is the cable space 40a for storing the cable 80 which connects the boards 70 and 70a.

Near the lower edge of the casing turning member 40 is axially supported as to the first casing 10 by the turning shaft supporting protruding unit 41 and first turning control shaft member 45. The first turning control shaft member 45 has a first supporting disc 43 for fixing to the casing turning member 40 and for axially supporting the first turning control shaft member 45, and a first disc suppressing ring 46 to control the turning angle with the first supporting disc 43.

On the other hand, near the upper edge of the casing turning member 40 axially supports the second turning control axis member 50, the second turning control shaft member 50 axially supports a second disc suppressing ring 51, and the second disc suppressing ring 51 axially supports a donut pulley 52. The donut pulley 52 has a flange shape, and is fitted into a pulley supporting unit 28 in a protruding shape provided on the second casing 20. Thus, the casing turning member 40 can slide along the second casing 20.

To accommodate the building in of the first turning control shaft member 45 and second turning control shaft member 50, an opening 40b for supporting the first turning control shaft member 45, and an opening 40c for supporting the second turning control shaft member 50, are respectively provided in appropriate positions on the face opposite from the turning shaft supporting protruding unit 41.

Turn Control Mechanism

With the present embodiment, a turn control mechanism for achieving a turning state as shown in FIGS. 4A through 4C is provided. This turning control mechanism is a mechanism to prevent turning farther than a state wherein the operating face 15 of the first casing 10 and the output face of the second casing 20 forms one face. This turning control mechanism is made with a first turning control axis member 45 and second turning control axis member 50.

Figure 8:
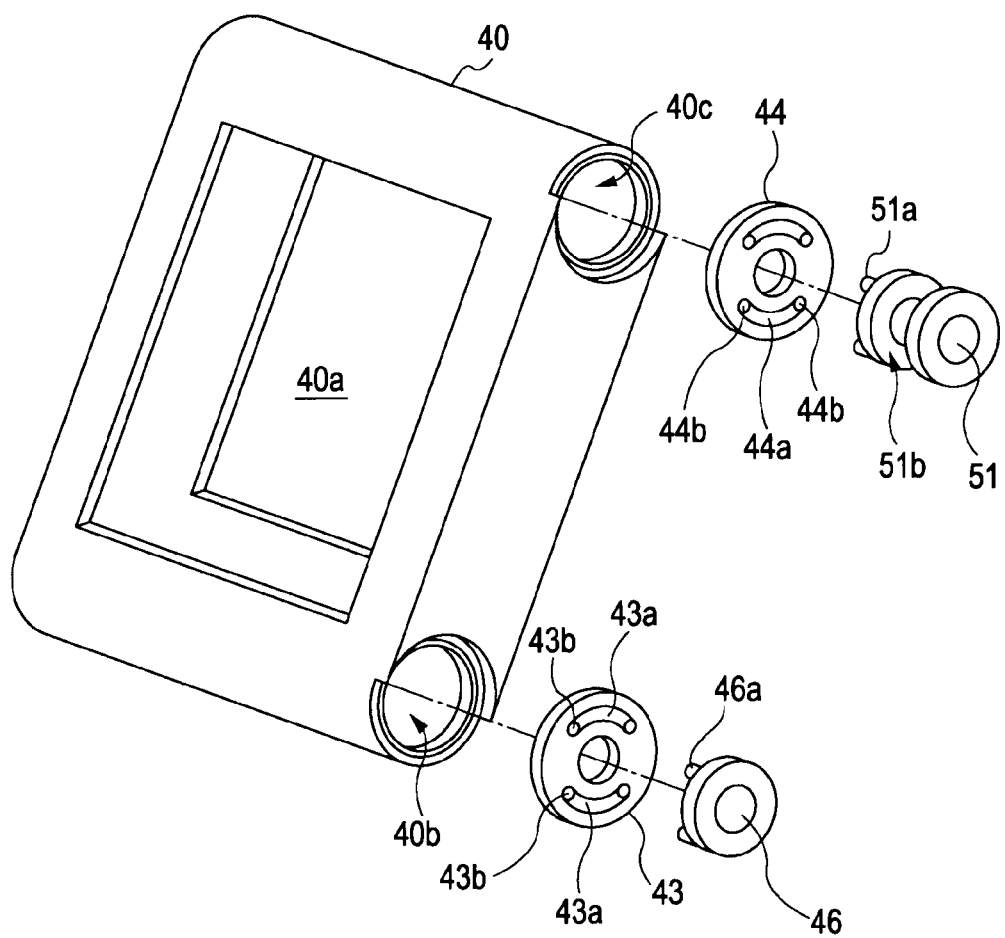
FIG. 8 is a configuration perspective view of the primary portions illustrated in FIG. 6.

As shown in FIG. 8, the first supporting disc 43 for supporting the first turning control shaft member 45 has a donut-shaped disc having a hole through which the first control shaft member 45 is inserted for support. Also, the face on the opposite side from the casing turning member 40 has two quarter-arc grooves 43a which are grooves along a quarter of the arc. The edge portions of each of the quarter arc grooves 43a become a hemispheric hole 43b which is a hole in the shape of a hemisphere somewhat deeper than the thickness of the groove.

The first disc suppressing ring 46 inserted into the first turning control shaft member 45 engages with such a first supporting disc 43. That is to say, the first disc suppressing ring 46 forming a donut-shaped disc has a hemisphere protruding portion 46a which fits into a hemisphere hole 43b. As shown in FIG. 7, the first disc suppressing ring 46 is attached in the direction of the first supporting disc 43 with a coil spring 47 wrapped onto a flange portion of the first turning control shaft member 50, a washer 54, and a spring suppressing ring 49.

The turning starting position and turning ending position has the hemisphere protruding portion 46a of the first disc suppressing ring 46 fitted into the hemisphere hole 43b of the first disc suppressing ring 46 and is controlled so that no further turning occurs. In the event that the hemisphere protruding portion 46a detaches from the hemisphere hole 43b and approaches the hemisphere hole 43b on the opposite side, the hemisphere protruding portion 46a goes surmounts the non-continuous state to the quarter-arc grooves 43a, so a clicking-sensation occurs.

The configuration of the second turning control shaft member 50 is similar to the first turning control shaft member 45, the different point being the point of having a configuration which can axially support the donut pulley 52.

That is to say, the second supporting disc 44 forms a donut-shaped disc having a hole therein for inserting and supporting the second turning control shaft member 50. Also, on the face on the opposite side from the casing turning member 40, two quarter-arc grooves 44a which are grooves along a quarter of an arc are provided so as to face one another. The edge portions of each quarter-arc groove 44a serve as the hemisphere holes 44b which are holes in a hemisphere shape somewhat deeper than the groove depth.

The second disc suppressing ring 51 inserted into the second turning control shaft member 50 engages the second supporting disc 44. That is to say, the second disc suppressing ring 51 configured as a donut-shaped disc has a hemisphere protruding portion 46a which fits into a hemisphere hole 43b. As shown in FIG. 7, the second disc suppressing ring 51 is attached in the direction of the first supporting disc 43 with a coil spring 53 wrapped onto a flange portion of the second turning control shaft member 54, a washer 48, and a spring suppressing ring 55.

The turning starting position and turning ending position has a hemisphere protruding portion 51a of the second disc suppressing ring 51 fitted into a hemisphere hole 44b of the second disc suppressing ring 44 and is controlled so that no further turning occurs. In the event that the hemisphere protruding portion 51a detaches from the hemisphere hole 44b and approaches the hemisphere hole 44b on the opposite side, the hemisphere protruding portion 51a surmounts the non-continuous state to the quarter-arc grooves 44a, so a click-sensation occurs.

Portable Information Terminal

FIG. 9 shows a plan view in the case that the present invention is applied to a portable information terminal such as a portable gaming device or PDA (portable data assistant) rather than a portable telephone terminal.

Figure 9A:
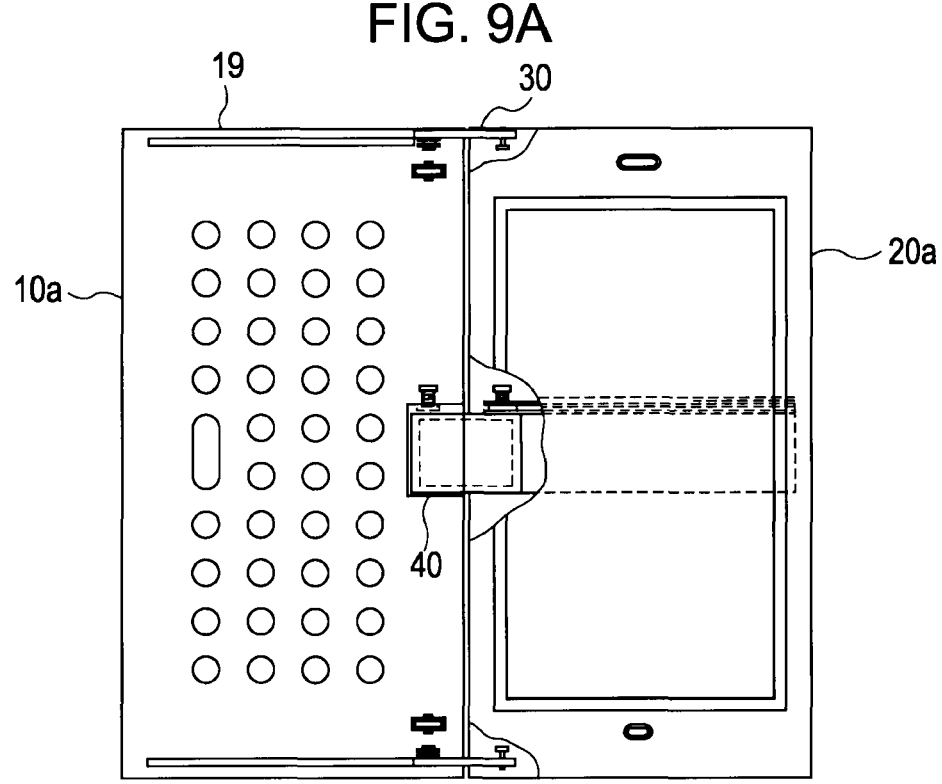
FIG. 9 is a plan view illustrating portable information terminals according to second and third embodiments of the present invention.

FIG. 9A illustrates a second embodiment. That is to say, the portable information terminal employs a keyboard casing 10a having a full keyboard for the first casing on the operating face, and employs a display screen casing 20a with an almost full-face output screen for the second casing. This is an embodiment primarily readily usable for a PDA, but can be used for a portable telephone terminal also, by creatively employing a portion of the output screen as a patch panel or employing operating buttons on the side face of the casing.

Figure 9B:
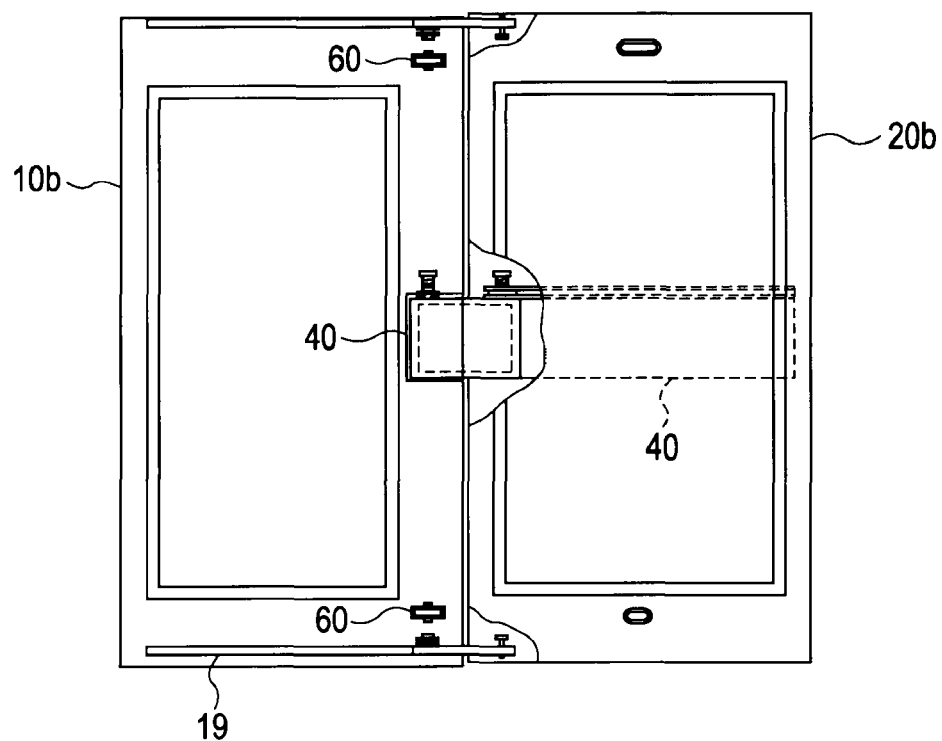

FIG. 9B illustrates a third embodiment. That is to say, both the first casing and second casing have a liquid crystal display screen, wherein the first casing is a touch panel casing lob of a patch panel type combined with an input device as necessary, and the second casing also is a touch panel casing 20b of a patch panel type combined with an input device as necessary. This is an embodiment primarily readily usable for gaming device, but can be used for a portable telephone terminal or PDA also, by creatively employing a portion of the output screen as a patch panel or employing operating buttons on the side face of the casing.

Variation of Sliding Mechanism

Figure 10A:
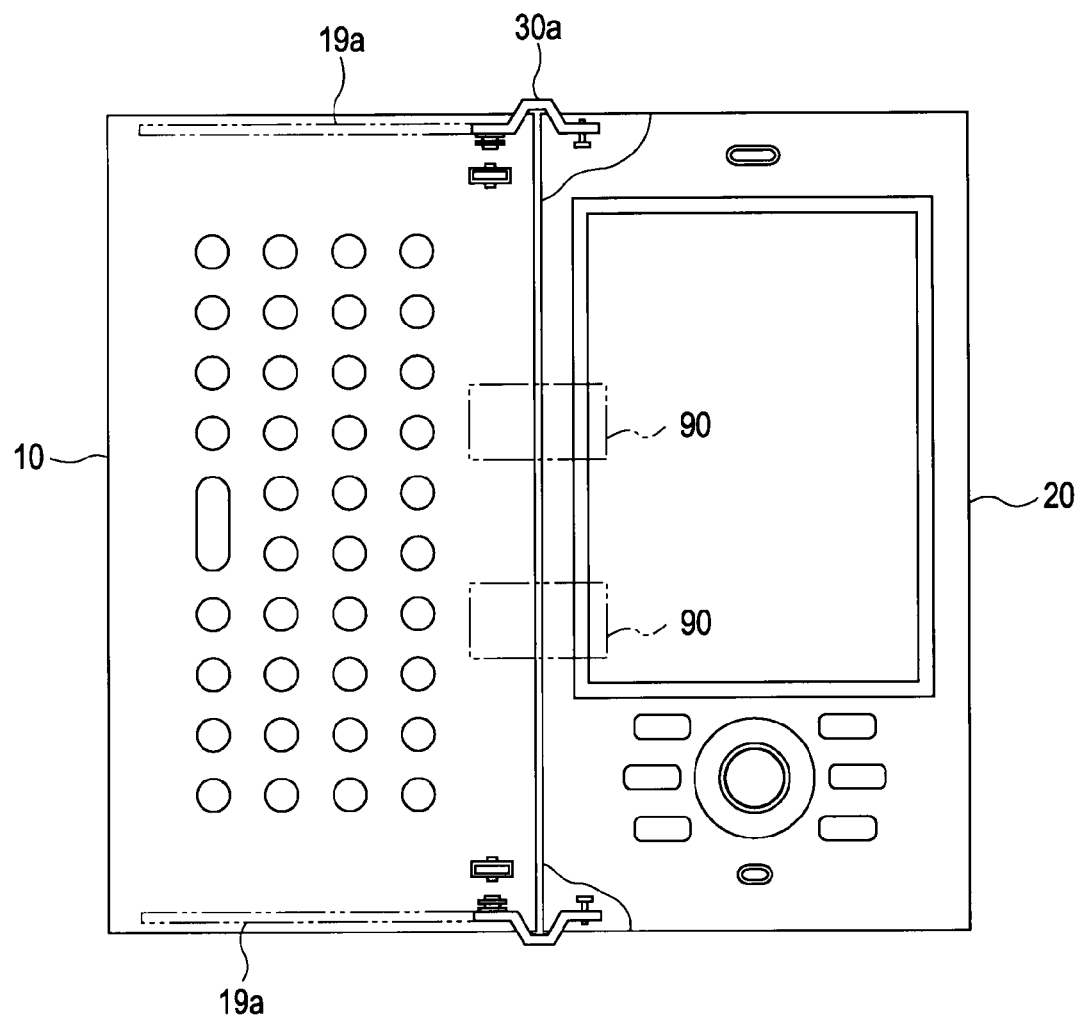
FIGS. 10A and 10B are plan views illustrating portable information terminals according to a fourth embodiment of the present invention.
Figure 10B:
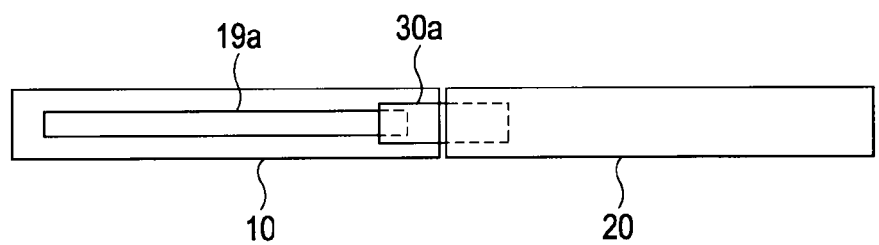

FIG. 10 illustrates a fourth embodiment. The differences between the embodiments up to this point are primarily two points. The first point is that with the first embodiment only one casing turning member provided near the center is provided as two casing turning members 90, 90 near the center. This is effective in the case that the dimensions in the vertical direction of the sheet of the portable information terminal shown in FIG. 10A are great. This is also effective in the case of substantially increasing design feature of the sliding wide groove 21 on the second casing 20 or the space for cable 40a.

The second point is that the sliding groove 19 provided on the first casing 10 is not provided on the operating face 15 side of the first casing 10, but provided on the side face of the first casing 10. This may also be employed in the case of substantially increasing area of the operating face 15, or improving design features of the operating face 15. This is also effective in the case that a design is required to view the sliding mechanism or turning control mechanism.

Casing Dimension Variation

Figure 11A:
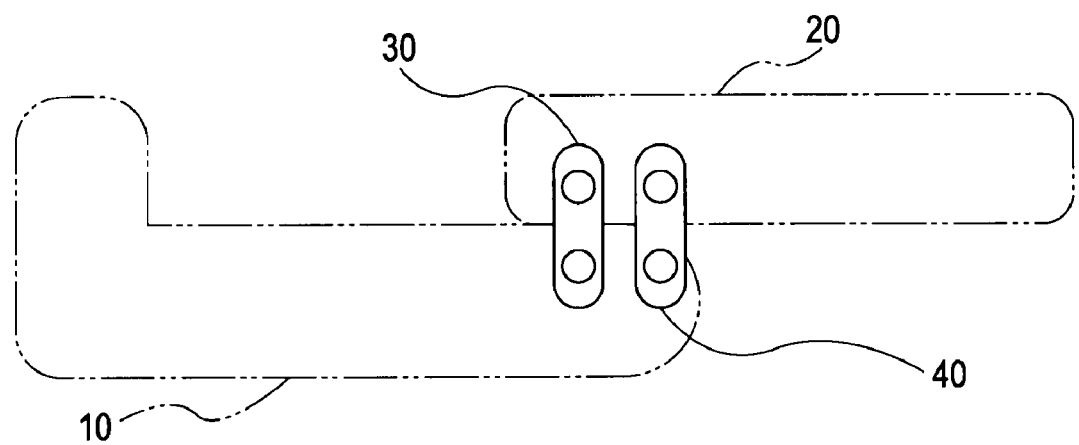
FIGS. 11A and 11B are cross-sectional diagrams illustrating a portable information terminal according to a fifth embodiment of the present invention.
Figure 11A:
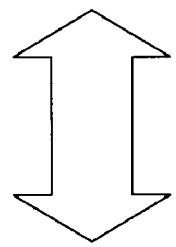
Figure 11B:
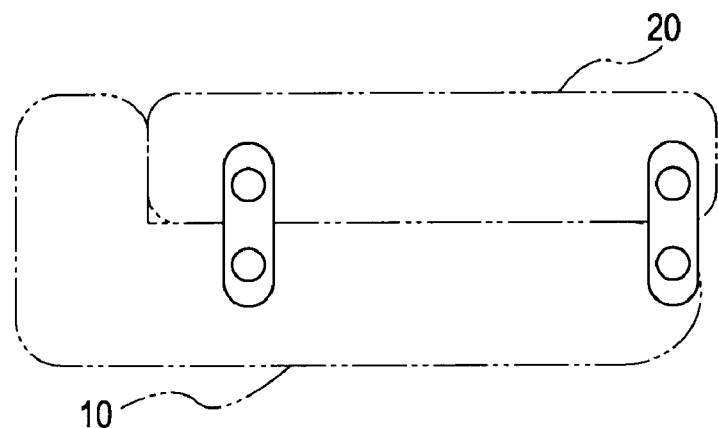

FIG. 11 illustrates a fifth embodiment. The different point from the embodiments described up to this point is the point that the dimensions in the sliding direction between the first casing 10 and second casing 20 and the dimensions in the thickness direction differ.

With the embodiment shown in FIG. 11, the dimensions in the sliding direction of the first casing 10 are smaller than those of the second casing 20, and the thickness of the first casing 10 is formed thinner than the second casing 20.

Note that while not shown, the dimensions in the vertical direction of the sheet may differ between the first casing 10 and second casing 20.

Turning Control Mechanism Variation

Figure 12A:
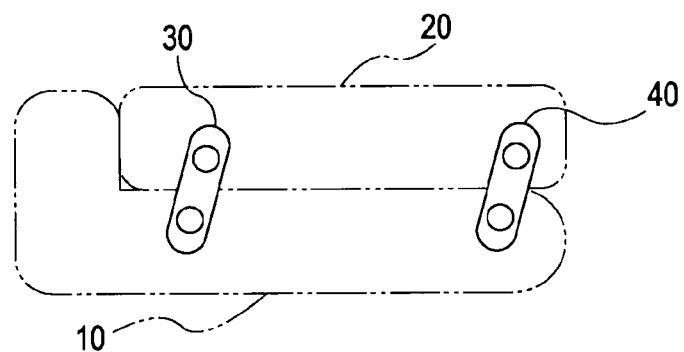
FIGS. 12A through 12C are a cross-sectional diagrams illustrating a portable information terminal according to a sixth embodiment of the present invention.
Figure 12B:
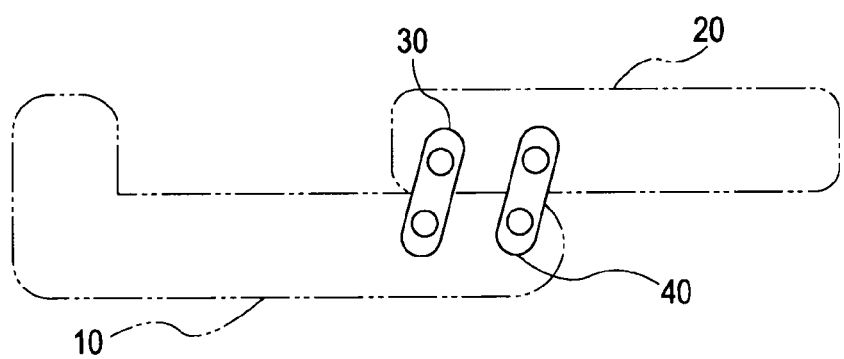
Figure 12C:
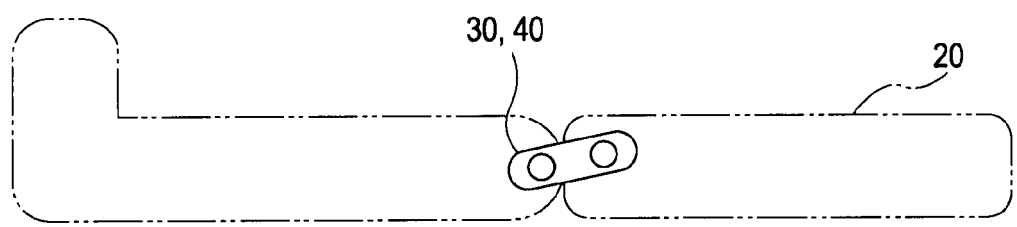
Figure 13A:
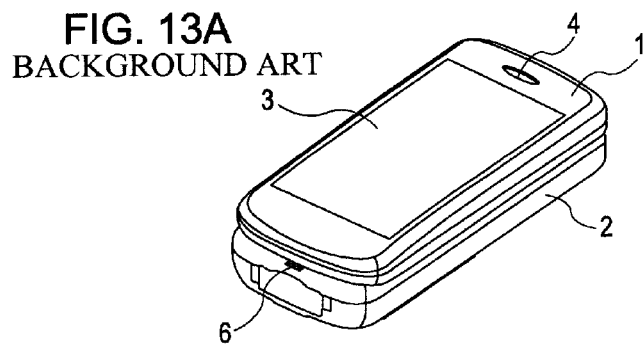
FIGS. 13A and 13B are perspective views of related art.
Figure 13B:
Figure 13B:
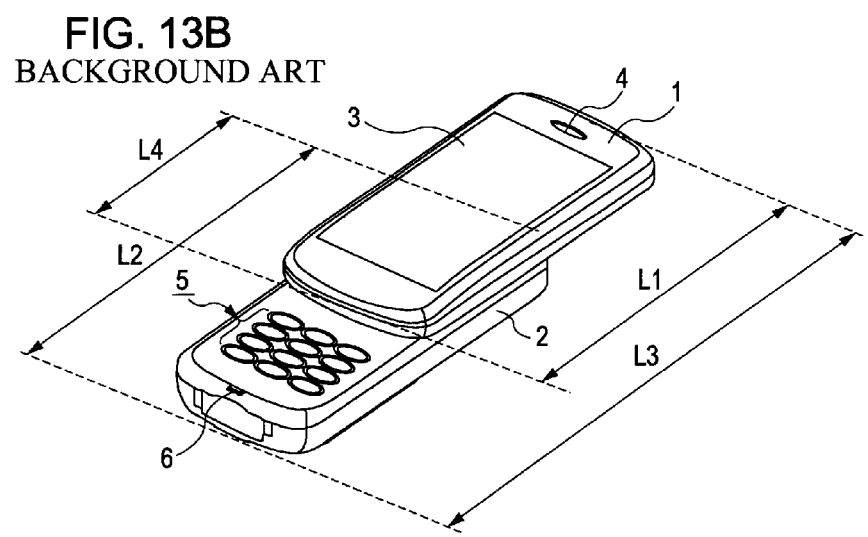

FIG. 12 illustrates a sixth embodiment. With the embodiments described up to this point, when in a portable state and in a sliding state, the angle forming between the lengthwise direction of the sliding supporting member 30 and casing turning member 40, and the lengthwise direction of the first casing 10 and second casing 20 has been described as being 90 degrees. Also, when in a usable state, the angle forming between the lengthwise direction of the sliding supporting member 30 and casing turning member 40 and the lengthwise direction of the first casing 10 and second casing 20 has been described as being 0 degrees (parallel).

However, as shown in FIG. 12, the angle forming between the lengthwise direction of the sliding supporting member 30 and casing turning member 40 and the lengthwise direction of the first casing 10 and second casing 20 is not particularly restricted to 90 degrees or 0 degrees. The turning control mechanism only needs to function in order for the first casing 10 and second casing 20 to maintain the portable state and sliding state, or in order to prevent turning more than necessary when in the usable state.

Note that the descriptions of embodiments described above are only an example of the present invention. The present invention is not limited to the various embodiments described above, and it goes without saying that various modifications may be made according to design and so forth, insofar as they are within the technical spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A sliding-type portable information terminal comprising:
 a flat first casing;
 a flat second casing which is overlapped on the first casing;
 a sliding mechanism to maintain a portable state of said first casing and said second casing overlapped together; and
 a turning mechanism to change from said portable state to a usable state via a sliding state whereby said first casing and said second casing mutually slide;
 said sliding mechanism formed with
 a first sliding mechanism having
  a sliding groove formed in the sliding direction in the first casing,
  a sliding supporting member formed to slide within the sliding groove without disengaging from the sliding groove, and
  a first fixing member to axially support an inverse sliding groove side on the sliding supporting member with the second casing; and
 a second sliding mechanism having
  a wide sliding groove formed on the first casing side of the second casing; and
  a casing turning member to slide within the wide sliding groove;
 said turning mechanism having
  said casing turning member,
  a first turning control member to axially support the inverse sliding wide groove side of the casing turning member with the first casing, and
  a second turning control member which is on the opposite side from said first turning control member on the casing turning member and which axially supports the second casing side so as to be turnable;
 wherein the first turning control member and the second turning control member have a turning angle control mechanism wherein turning is stopped at a angle formed by the face on the opposite side of the face of the second casing side of the first casing and the first casing side of the second casing forming a single face when the portable information terminal is in a usable state.

2. The portable information terminal according to claim 1, wherein
 the turning of said turning angle control mechanism is stoppable while in the portable state and sliding state, while in the state of the vertical cross-section lengthwise direction of said first casing and said casing turning member are at a predetermined angle;
 and wherein the turning of said turning angle control mechanism is stoppable while in the portable state and sliding state, while in the state of the vertical cross-section lengthwise direction of said second casing and said casing turning member are at a predetermined angle.

3. The portable information terminal according to either of claim 1 or 2, wherein two pairs of said first sliding mechanism are provided on the first casing.

4. The portable information terminal according to claim 3, wherein the sliding groove on the first sliding mechanism is formed on the second casing side of the first casing.

5. The portable information terminal according to claim 3, wherein the sliding groove on the first sliding mechanism is formed on the side face of the first casing.

6. The portable information terminal according to claim 1, wherein
 the flat form of the first casing and second casing are formed in roughly the same shape.

7. The portable information terminal according to claim 1, wherein
 said casing turning member has a space for a cable reaching the first casing and second casing;
 and wherein the space for cable is formed such that a cable or the like to connect a board built into the first casing and a board built into the second casing can be provided therewithin.

* * * * *